(12) United States Patent
Blackwell

(10) Patent No.: US 9,537,879 B2
(45) Date of Patent: Jan. 3, 2017

(54) CYBER SECURITY MONITORING SYSTEM AND METHOD FOR DATA CENTER COMPONENTS

(71) Applicant: AVOCENT HUNTSVILLE CORP., Huntsville, AL (US)

(72) Inventor: Steven R. Blackwell, Harvest, AL (US)

(73) Assignee: AVOCENT HUNTSVILLE, LLC, Huntsville, AL (US)

( * ) Notice: Subject to any disclaimer, the term of this patent is extended or adjusted under 35 U.S.C. 154(b) by 0 days.

(21) Appl. No.: 14/409,959

(22) PCT Filed: Jun. 21, 2013

(86) PCT No.: PCT/US2013/046944
§ 371 (c)(1),
(2) Date: Dec. 19, 2014

(87) PCT Pub. No.: WO2013/192477
PCT Pub. Date: Dec. 27, 2013

(65) Prior Publication Data
US 2015/0373038 A1 Dec. 24, 2015

Related U.S. Application Data

(60) Provisional application No. 61/662,591, filed on Jun. 21, 2012.

(51) Int. Cl.
*H04L 29/06* (2006.01)
*G06F 21/55* (2013.01)
(Continued)

(52) U.S. Cl.
CPC ..... *H04L 63/1425* (2013.01); *G06F 17/30876* (2013.01); *G06F 21/554* (2013.01); *G06F 11/3058* (2013.01); *G06F 11/3409* (2013.01)

(58) Field of Classification Search
CPC .... H04L 45/60; H04L 49/109; H04L 49/3009; H04L 49/351; H04L 49/356; H04L 63/0209; H04L 63/20; H04L 63/1433; H04L 63/1416; G06F 2221/2141; G06F 2221/2101; G06F 21/55; G06F 21/577; G06F 11/00; G06F 11/30; G06F 12/16; G06F 15/173; G06F 15/18; G06F 17/00; G06F 12/14; G08B 29/00; G08B 19/00; G07C 9/00571; G07C 9/00166; G07C 9/00103
(Continued)

(56) References Cited

U.S. PATENT DOCUMENTS 6,456,306 B1    9/2002  Chin et al.
7,237,267 B2 *  6/2007  Rayes ............... H04L 63/20
                                                713/165

(Continued)

FOREIGN PATENT DOCUMENTS

CN    101207516 A    6/2008
CN    101826993 A    9/2010
CN    102364444 A    2/2012

OTHER PUBLICATIONS

Amiruddin Bin Husin, "A Study on Effectiveness of Network Monitoring System Software in Local Area Network Environment", 2008, Retrieved from http://library.utem.edu.my/index2.php?option=com_docman&task=doc_view&gid=3351&Itemid1113, pp. 10-13.

(Continued)

*Primary Examiner* — Thanhnga B Truong
(74) *Attorney, Agent, or Firm* — Harness, Dickey & Pierce, P.L.C.

(57)    ABSTRACT

A security monitoring system is disclosed which is adapted for use with a component having a service processor. The system may use a device configured to communicate with (Continued)

the component. A network may be used which is dedicated to communicating with the service processor for routing only data concerning performance or health of the component. The device may also use at least one subsystem for analyzing the data concerning health or performance of the component to determine if a security threat has affected operation of the component.

9 Claims, 3 Drawing Sheets

(51) Int. Cl.
G06F 17/30 (2006.01)
G06F 11/30 (2006.01)
G06F 11/34 (2006.01)

(58) Field of Classification Search
USPC ........................................ 726/22–26; 340/5.3
See application file for complete search history.

(56) References Cited

U.S. PATENT DOCUMENTS

| | | | |
|---|---|---|---|
| 7,847,675 B1* | 12/2010 | Thyen | G07C 9/00896 340/5.1 |
| 7,899,090 B2 | 3/2011 | Mittapalli et al. | |
| 8,154,398 B2* | 4/2012 | Rolf | G01W 1/00 340/10.1 |
| 8,364,833 B2* | 1/2013 | Bennett | H04L 63/0245 370/465 |
| 8,407,765 B2* | 3/2013 | Wiley | H04L 41/0896 726/2 |
| 2005/0129035 A1 | 6/2005 | Saito | |
| 2006/0235650 A1 | 10/2006 | Vinberg et al. | |
| 2006/0259809 A1* | 11/2006 | Mishra | G06F 21/552 714/4.4 |
| 2007/0180522 A1* | 8/2007 | Bagnall | G06F 21/55 726/22 |
| 2008/0320136 A1 | 12/2008 | Holt et al. | |
| 2010/0122120 A1 | 5/2010 | Lin | |
| 2012/0169458 A1* | 7/2012 | Dubois, Jr. | G07C 9/00571 340/5.3 |

OTHER PUBLICATIONS

International Search Report and Written Opinion for PCT/US2013/046944, mailed Oct. 16, 2013; ISA/KR.

Notification of First Office Action and Office Action issued by Chinese State Intellectual Property Office in mrresponding Chinese Patent Application No. 2013800327271, dated Sep. 12, 2016, 20 pages.

* cited by examiner

CYBER SECURITY MONITORING SYSTEM AND METHOD FOR DATA CENTER COMPONENTS

CROSS-REFERENCE TO RELATED APPLICATIONS

This application claims priority to U.S. Provisional Application No. 61/662,591, filed on Jun. 21, 2012. The entire disclosure of the above application is incorporated herein by reference.

FIELD

The present disclosure relates to cyber security systems. More particularly, the present disclosure relates to a cyber security monitoring system and method that makes use of an out of band network connection to a service processor or security processor present within each of the various data center components. The service processor or security processor helps detect when abnormal behavior is exhibited by its associated component without relying on the use of a production network that the component is operating on, and without relying on the main processor of the component.

BACKGROUND

The statements in this section merely provide background information related to the present disclosure and may not constitute prior art.

Cyber security is an area of increasing focus and importance for both governments as well as private industry. Hackers are becoming increasingly creative, and on occasion are believed to even be funded by governments and terrorist organizations. Annual losses from cyber attacks to business and governments are presently estimated to approach one trillion dollars. With increasing frequency, governments and private industries are being targeted for attack. Often, attacks may not be identified for months or even years after significant damage has been done to computers and/or other network or infrastructure equipment.

Present day cyber security tools like virus scanners and network traffic monitors are designed to run on the production network (sometimes referred to as a "main" network) of a facility. As such, they themselves are sometimes the object of cyber attacks. If an attacker compromises the network, or even a single component, whether that be an information technology (IT) device or an infrastructure device (e.g., air conditioning unit, power distribution unit, etc.), the potential arises for that compromised component to distribute the virus to other components that it is in contact with. As another example, consider a server that has been hacked. The sources of data used by antivirus software that are present on the server may also then be compromised. Alternatively, the virus scanner itself may have been hacked. In either case, from that point on the virus scanner software cannot be relied upon to give accurate data about attacks. Similarly, other commonly used network components such as routers can also be hacked. And once compromised, router based network monitoring (e.g., of IP addresses) cannot be fully relied upon to produce accurate data on potential cyber attacks.

SUMMARY

In one aspect the present disclosure relates to a security monitoring system adapted for use with a component having a service processor. The system may comprise a device configured to communicate with the component. A network may be included which is dedicated to communicating with the service processor for routing only data concerning at least one of performance and health of the component. The device may include at least one subsystem for analyzing the data concerning at least one of the health and performance of the component to determine if a security threat has affected operation of the component.

In another aspect the present disclosure relates to a security monitoring system adapted for use with first and second components, the first component having a first service processor and the second component having a second service processor. The system may comprise a device configured to communicate with the first and second components. A network may be included which is dedicated to communicating with the service processors of each of the first and second components. The network may be used for routing data received from the service processors of the first and second components to the device. The device may also include at least one subsystem for analyzing the data in real time to determine if a security threat has affected operation of either of the first and second components.

In still another aspect the present disclosure relates to a method for security monitoring of a component having a service processor. The method may comprise using a device configured to communicate with the component. A network dedicated to communicating with the service processor may be used for routing only data concerning performance or health of the component. The device may be used to analyze the data concerning health or performance of the component to determine if a security threat has affected operation of the component.

BRIEF DESCRIPTION OF THE DRAWINGS

The drawings described herein are for illustration purposes only and are not intended to limit the scope of the present disclosure in any way. In the drawings.

DETAILED DESCRIPTION

Figure 1:
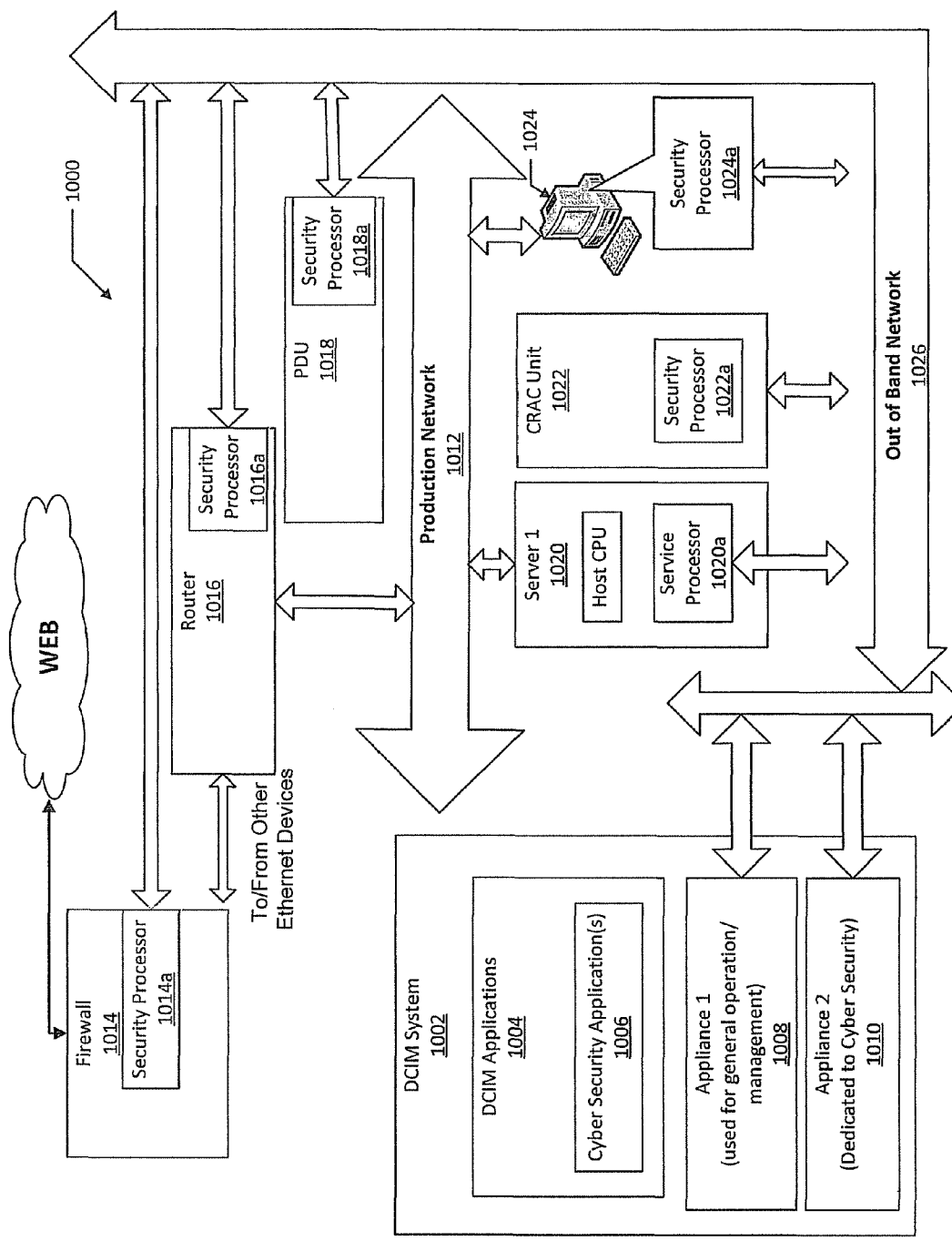
FIG. 1 is a high level block diagram showing an implementation of one example of the present cyber security monitoring system of the present disclosure where service processors in servers are connected to an independent, out of band network, and monitored through the use of an independent monitoring appliance, and further wherein various components that would not normally have a service processor are modified to include a new security processor which also communicates with the monitoring appliance only via the out of band network.

The following description is merely exemplary in nature and is not intended to limit the present disclosure, application, or uses. It should be understood that throughout the drawings, corresponding reference numerals indicate like or corresponding parts and features.

Referring to FIG. 1, there is shown a cyber security system 1000 in accordance with one embodiment of the present disclosure. The cyber security system 1000 may use all or portions of a data center infrastructure management ("DCIM") system 1002. The cyber security system 1000 takes advantage of a component termed a "service processor" which now is commonly used in many present day blade servers and standalone servers. A service processor is a processing component which is physically separate from the main processor used in the server. Whereas the main processor in a server is used to perform server operational functions, the service processor is used to monitor environmental and operating conditions associated with the server and to provide remote access (such as KVM and serial console port access) to allow administrators to access and control server operation. Such operating conditions may involve monitoring a fan speed of one or more fans used in the server, monitoring the real time electrical power draw of the server, monitoring temperatures from one or more temperature sensors located within the server, monitoring information concerning utilization of the main processor, and other variables that relate to server operation and/or health. Importantly, the service processor provides access to these types of information without being constrained by the server's BIOS or operating systems. And just as important, the service processor cannot be accessed through the production network connection to the server, but rather only through a separate "service processor" port on the server. As a result of this, there effectively exists an "air gap" like partition between the main processor and the service processor. In a less optimum configuration, communications between the main processor and the service processor are supported but the service processor continues to execute its own programming independently of the main processor.

The system 1000 goes further and also includes a new security processor in one or more of those network components which typically would not have their own service processor. Importantly, both the service processors and the security processors may be placed in communication with a dedicated monitoring appliance over an out of band management network. By "out of band" network it is meant an independent network that operates to pass monitoring and health information from the components to the dedicated monitoring appliance. In some systems, management and control information and other administrative traffic is also carried on the out of band network, but, importantly, this network is separated from the production or "in band" network. Put differently, the out of band network and the production network are completely independent of one another; that is, the production network cannot be used to access the service processors and security processors in the various servers and other network components. With servers, the out of band network connection is made at the server's service processor port.

With further reference to FIG. 1, the system 1000 in this example is in communication with the DCIM system 1002. The DCIM system 1002 in this example may have one or more DCIM applications 1004 running on it. The DCIM applications 1004 may include one or more cyber security applications 1006. The DCIM system 1002 may also include at least one device, in this example an appliance 1008, and in a further example a remote access appliance such as a KVM (keyboard/video/mouse) appliance, for interfacing to the various network and infrastructure components being monitored. A second appliance 1010, which may also be a remote access or KVM appliance, may be dedicated to obtaining and analyzing information and data from service processors and security processors of the network and infrastructure components being monitored.

The system 1000 employs a production network 1012 which one or more components may use to communicate over. Such components may include, merely by way of example and without limitation, a firewall 1014, a router 1016, a server 1020, and a personal computer ("PC") 1024. Other components or products, such as, without limitation, a PDU (Power Distribution Unit) 1018 and a CRAC (computer controlled room air conditioning) unit 1022 may be in communication with an out of band (sometimes referred to as "management") network 1026.

The server 1020 has its own service processor 1020a, while a new security processor has been included in each of the firewall 1014, the router 1016, the PDU 1018, the CRAC unit 1022 and the PC 1024 (the security processors being identified by reference numbers 1014a, 1016a, 1018a, 1022a and 1024a, respectively). Each of the security processors 1014, 1016a, 1018a, 1022a and 1024a may have some components in common (e.g., a central processing unit), but may also contain one or more additional subsystems that are tailored to the nature of their respective host components. For example, CRAC unit 1022 may have different operational parameters that will be of interest, from a security monitoring standpoint (e.g., power draw) than, for example, router 1016 would have. Each of the security processors 1014a, 1016a, 1018a, 1022a and 1024a are thus constructed to take advantage of the functionality of their respective host components and to gather one or more specific types of use data that may be available from their respective host components. Each of the security processors 1014a, 1016a, 1018a, 1022a and 1024a and the service processor 1020a communicate over the out of band network 1026 with the second appliance 1010.

Figure 2:
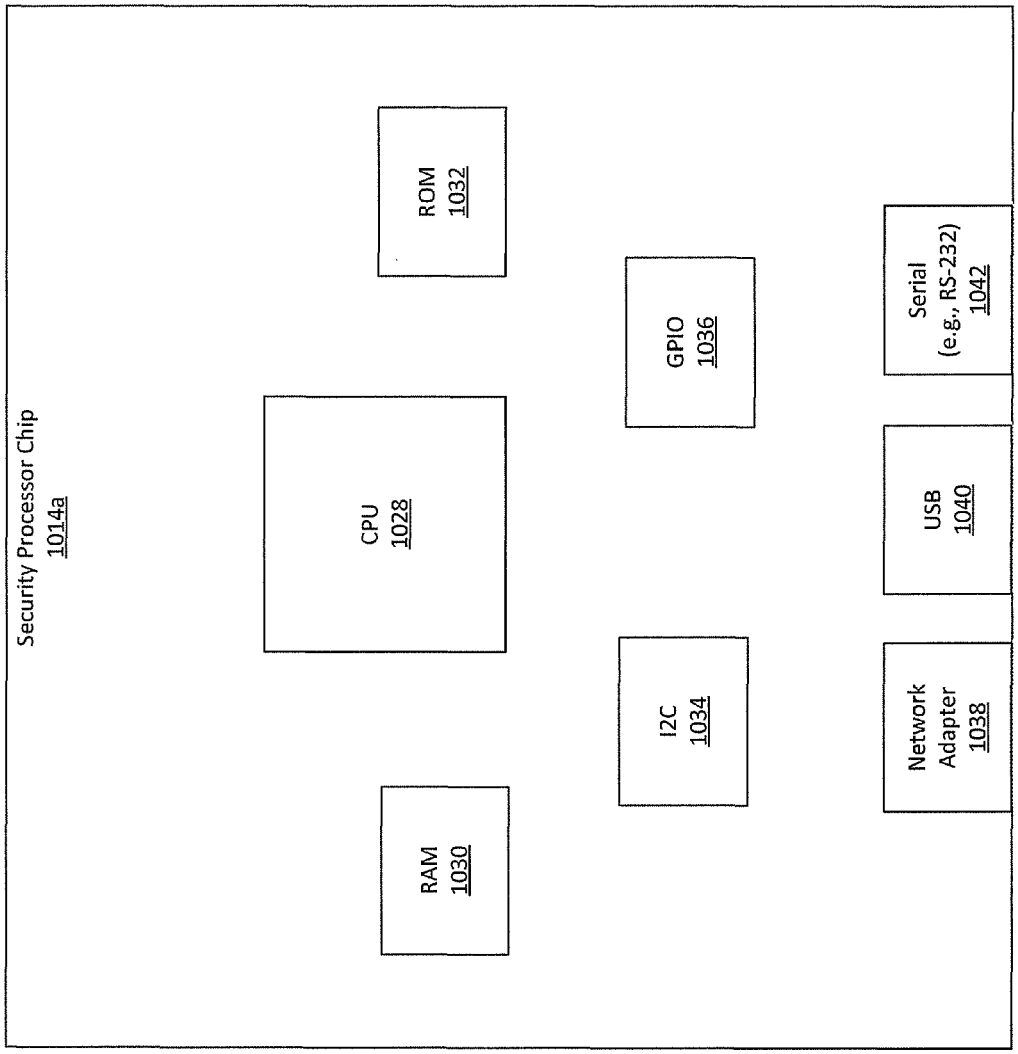
FIG. 2 is a high level block diagram of one example of various subsystems and components that may be present within the security processor.

With reference to FIG. 2, one example of security processor 1014a is shown. As noted previously, the security processors 1014a, 1016a, 1018a, 1022a and 1024a may all be identical in construction, but more preferably may differ slightly in construction to best meet the functionality of their host component. As such, while security processor 1014a is shown in FIG. 2 to include various subsystems and components, it will be appreciated that not all of these subsystems and components may be needed in every one of the other security processors 1016a, 1018a, 1022a and 1024a. Conversely, one or more of the other security processors 1016a, 1018a, 1022a and 1024a could include one or more specific components or subsystems to best adapt it for use with its host component. Thus, the configuration of the security processor 1014a shown in FIG. 2 is merely intended to represent one example of the various subsystems and components that may be used in forming a suitable security processor for use with the present system 1000.

In FIG. 2 the security processor 1014a may include a suitable CPU 1028, for example one of the ARM® family of processors available from Texas Instruments, Inc. The security processor 1014a may also include a random access memory 1030, a read only memory 1032, and one or more interfaces such as a I²C interface 1034, a general purpose input/output (GPIO) 1036, or any other needed form of interface that enables the security processor 1014a to communicate with the pertinent subsystem(s) of its host router 1014. A network adapter 1038 may be used to interface the security processor 1014a to the out of band network 1026. Other interfaces such as a USB interface 1040 and/or a serial interface 1042 (RS-232, RS-422, etc.) may optionally be included. The entire security processor 1014a may be embodied in a single integrated circuit, making it easy to integrate into its host component. Preferably, a mechanism is included for disabling field re-programmability to further eliminate any possibility of the programming (i.e., firmware) of the security processor 1014a being altered once it is installed in its host component.

Figure 3:
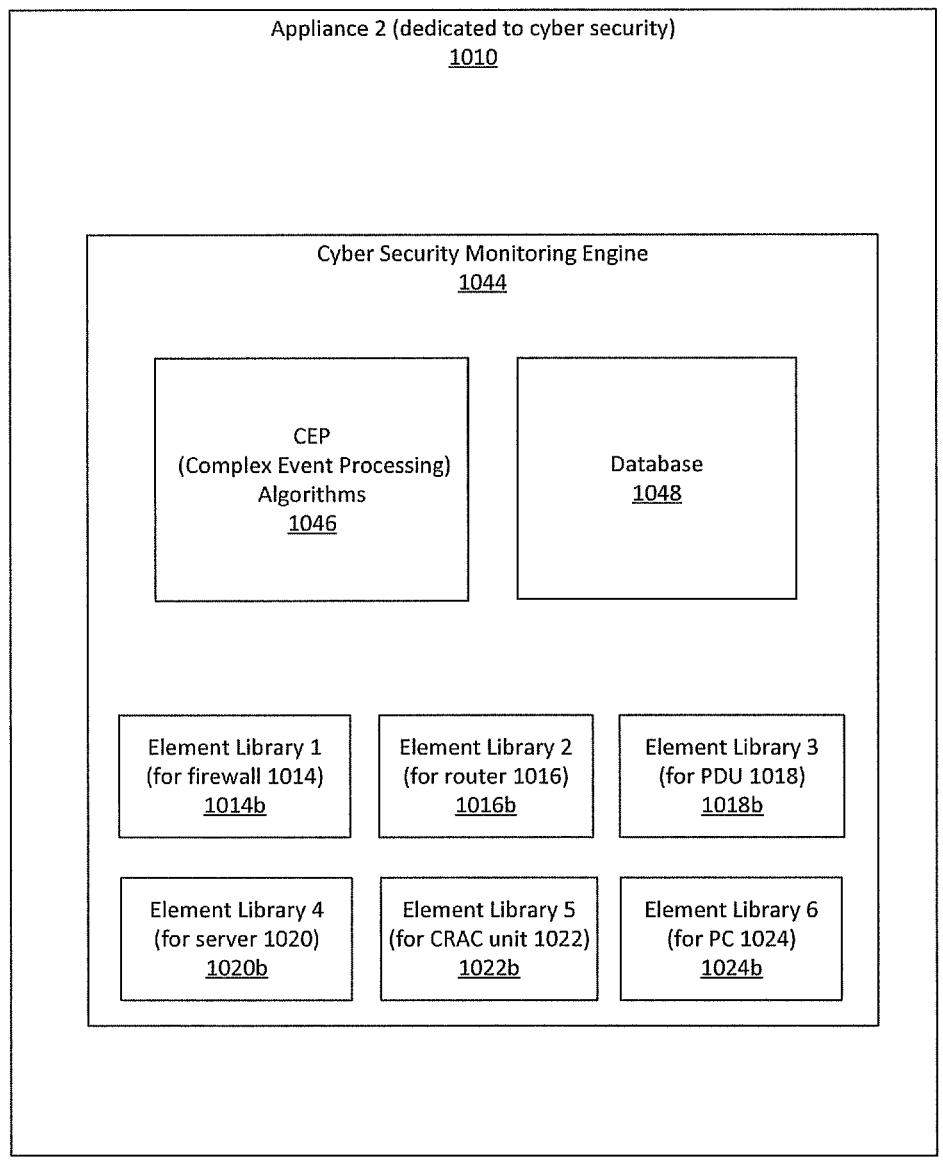
FIG. 3 is a high level block diagram illustrating one example of the cyber security monitoring appliance showing various internal subsystems that may be used in the appliance.

Referring now to FIG. 3, a high level diagram of one example of the second appliance 1010 is shown. The second appliance 1010 may optionally include a new instance of a software and/or hardware security monitoring engine 1044 which is dedicated to collecting data for cyber security monitoring purposes. However, it is anticipated that in most applications, it may be more desirable (at least from a cost standpoint) to provide the required cyber security profiles (i.e., complex event processing algorithms, element libraries, etc.) within an existing system or application that is included in the DCIM system 1002.

The second appliance 1010 acquires and consolidates security related data while the first appliance 1008 acquires and consolidates operating data used for managing the components 1014-1024. The cyber security monitoring engine 1044 may include complex event processing (CEP) algorithms 1046 that perform real time pattern detection to detect anomalies in usage patterns. More specifically, the cyber securing monitoring engine 1044 may use the CEP algorithms 1046 to monitor for specific attack signatures that indicate anomalous operation of one or more of the monitored components. Anomalies may include spikes in CPU utilization for a processor of the component being monitored, an unusually elevated power consumption (e.g., of a server), or an abnormally low power consumption (e.g., of CRAC unit) of a component being monitored. Essentially, the CEP algorithms 1046 are used to look for any operational characteristic(s) of the monitored components that indicates something unusual about the performance of the components. A detected anomaly may alert a data center manager to investigate the operation of a specific component more closely. A significant advantage is that the CEP algorithms 1046 are being used to collect security-related data from the components in real time. The CEP algorithms 1046 may be custom written for each specific component being monitored to address and take advantage of the operating information or data (e.g., power draw, processor utilization, operating temperature, memory usage, network traffic, executing processes, etc.) available from, or associated with, each component being monitored. Producing the CEP algorithms 1046 may require knowledge of "typical" or historical operating parameters or performance of the specific host component of interest. For example, historical knowledge of the power draw of a server under both light and heavy utilization, and/or during certain times of the day, could be used to form parameters that are analyzed using a specific CEP algorithm. Parameters from two of more distinct components could be analyzed together by one or more CEP algorithms to detect anomalous operation. For example, if the collective power draw of a group of servers in a given equipment rack is outside the range of what would be expected, when considering the real time CPU utilization of the servers, then such a condition could be detected by looking at the collective power draw of all of the servers in a given rack relative to their collective CPU utilizations. Another example is historical temperature data from a given device or collection of devices. The collected temperature data could be compared against historical power draw data for the same collection of devices. In this example if the collected power draw data is incongruous with the obtained temperature data, this may provide an early warning sign that a component has been affected by a cyber security attack. In any event, the CEP algorithms 1046 can be used to analyze the data produced by the host component to help identify anomalies in the operation of the host component.

The second appliance 1010 of FIG. 3 may further include an optional database 1048 for storing collected data (e.g., processor utilization data; power draw data, temperature data, etc.). A plurality of element libraries 1014b-1024b may optionally be included in the cyber security monitoring engine 1044, one for each of the components 1014-1024 being monitored in FIG. 1. However, the element libraries 1014b-1024b may instead be incorporated in a different subsystem of the DCIM 1002. Each of the element libraries 1014b-1024b may include the necessary information (e.g., protocols, commands, etc.) that allows the second appliance 1010 to communicate with specific ones of the monitored components 1014-1024.

From the foregoing it will be appreciated that the system 1000 forms a means for security monitoring a wide variety of network and infrastructure components that may be used in a data center or in any other type of business or scientific environment. The system 1000 is especially well adapted to provide early warning of a possible cyber attack, which conventional virus monitoring software might not be able to detect for days, weeks or even months after the attack begins. The various embodiments of the system 1000 are fundamentally different from conventional virus scanning and like security equipment, which typically rely on information obtained from the main processor of the device being monitored and transmitted over the production network. Because the system 1000 makes use of a separate processor for each component being monitored, which separate processor is not accessible via the production network but rather only via a fully independent separate network (i.e., the out of band network), a high degree of integrity exists for the collected data. An additional advantage is that even if a specific component becomes the subject of a cyber security attack and access to it is compromised via the production network, the service processor or security processor will still be accessible via the out of band network 1026. In other words the access to the affected component is not constrained by the component's BIOS or operating system.

While the various embodiments discussed herein are expected to become especially valuable in government applications, for example in connection with governmental security and military computer systems and data centers, electrical power plants, water treatment plants, etc., the embodiments of the system 1000 may be implemented with little or no modifications in a wide variety of other applications. For example, the system 1000 is also expected to find utility in manufacturing environments to perform security monitoring in real time on the operation of various important computer controlled manufacturing equipment (e.g., assembly robots, computer controlled furnaces, computer controlled CNC equipment, etc.). The system 1000 may also find utility in hospital environments to perform security monitoring for patient billing records and for any other computer controlled equipment (e.g., MRI, CAT scan, etc.) being used in a hospital environment which could potentially be infected by a virus or damaged by a hacker. Still other applications of the system 1000 could involve security monitoring of computer and data storage systems used by financial institutions such as banks and investment companies. Still other applications could be in connection with computer systems used by retailers that maintain inventory records, billing records and customer credit card information. These are but a few of the possible applications for the system 1000, and IT security professionals will recognize many other potential applications as well.

While various embodiments have been described, those skilled in the art will recognize modifications or variations which might be made to the disclosed subject matter without departing from the present disclosure. The examples illustrate various embodiments and are not intended to limit the present disclosure. Therefore, the description and claims should be interpreted liberally with only such limitation as is necessary in view of the pertinent prior art.

What is claimed is:

1. A security monitoring system adapted for use with a component, the system comprising:
    a main processor disposed in the component for performing operational functions and communicating over a production network;
    a second processor in the form of a service processor disposed in the component for communicating performance and health data, solely over a management network independent of the production network;
    a device configured to communicate with the main processor of the component over only the production network, and with the service processor of the component over only the management network;
    the management network being segregated from the production network and being utilized for communicating with the service processor to route only the performance and health data associated with the component to the device in real time, and the performance and health data concerning at least one of main processor utilization, electrical power usage and temperature; and
    the device further a processor based complex event processing engine for performing real time pattern detection and analysis of the performance and health data, and to evaluate the performance and health data against at least one stored usage pattern of an aspect of the component to detect whether an anomaly is present in a usage pattern of the device, and wherein the detected anomaly indicates that a security threat has affected operation of the component.

2. The security monitoring system of claim 1, wherein the device comprises a remote access appliance.

3. The security monitoring system of claim 1, wherein the usage pattern is analyzed using a complex event processing algorithm.

4. The security monitoring system of claim 3, wherein the performance and health data comprises a plurality of:
    the temperature data associated with operation of the component;
    the main processor utilization data associated with operation of the main processor of the component; and
    the electrical power usage data associated with electrical power being drawn by the component;
    and wherein the device analyzes the data to detect an anomalous operating condition of the component indicating that a potential security threat has affected operation of the component.

5. The security monitoring system of claim 1, wherein the device includes a database for storing the data.

6. The security monitoring system of claim 1, wherein the device includes an element library associated with the component, the element library including at least one of protocols and commands to enable the device to communicate with the component.

7. The security monitoring system of claim 1, wherein the management network comprises an out of band network.

8. A method for security monitoring of a component communicating over a production network, and having a service processor, the method comprising:
    using a device to communicate with a main processor of the component only over the production network;
    using the device to communicate with the service processor of the component only over a management network, to receive health and performance related data of the component, the health and performance related data relating to at least one of power usage of the component, main processor utilization data for the main processor of the component, and temperature data of the component;
    using a complex processing engine of the device configured to receive the health and performance related data using only the management network;
    the management network being independent from the production network; and
    using the complex processing engine of the device to analyze the performance data of the component in real time against a stored usage pattern relating to at least one performance aspect of the component, to determine if a usage anomaly is present, wherein the usage anomaly indicates that a security threat has affected operation of the component.

9. The method of claim 8, wherein:
    using the device comprises using the complex event processing engine to analyze two or more of the temperature data, the power usage and the main processor utilization data to identify the security threat.

* * * * *